[19] United States Patent
Ashall

[11] 3,935,139
[45] Jan. 27, 1976

[54] BINDER COMPOSITIONS
[75] Inventor: Ronald James Ashall, Wigan, England
[73] Assignee: Fibreglass Limited, St. Helens, England
[22] Filed: July 5, 1974
[21] Appl. No.: 486,070

[30] Foreign Application Priority Data
July 18, 1973 United Kingdom............... 34199/73
Apr. 18, 1974 United Kingdom............... 17089/74

[52] U.S. Cl. ............... 260/17.5; 161/198; 260/124; 428/221
[51] Int. Cl.² ................... C08L 97/00; B32B 17/10
[58] Field of Search ........... 161/198; 260/17.5, 124; 428/221

[56] References Cited
UNITED STATES PATENTS

| | | | |
|---|---|---|---|
| 2,846,431 | 8/1958 | Goss .................................. | 260/124 |
| 2,849,314 | 8/1958 | Goss et al. ...................... | 260/124 X |
| 2,891,918 | 6/1959 | Uschmann ........................ | 260/17.5 |
| 3,072,634 | 1/1963 | Santelli et al. ................. | 260/17.5 X |
| 3,090,700 | 5/1963 | Ball et al........................ | 260/17.5 X |
| 3,141,873 | 7/1964 | Kirkland ........................ | 260/17.5 X |
| 3,704,199 | 11/1972 | Smucker............................ | 428/221 |
| 3,790,441 | 2/1974 | Ashall................................ | 161/198 |
| 3,790,442 | 2/1974 | Ashall................................ | 161/198 |

OTHER PUBLICATIONS
Sarkanen & Ludwig, Lignins, pp. 852–855, 858–859, 861–865, (Wiley, 1971).
C. A. 47, 12806d, (1953), 56, 1641b, (1962); 57, 2467d, (1962), 58, 7030a (1963), 58, 14299d (1963).
Tappi, 36, No. 6, 175A-6A, No. 9, 14A, 16a, 18A, 20A, (1953), Pearl et al., in Forest Prod. J. 10, (2), 91 (1960).
Anon, Paper Trade J., 140, 27 (1956).

*Primary Examiner*—Murray Tillman
*Assistant Examiner*—T. DeBenedictis, Sr.
*Attorney, Agent, or Firm*—Schuyler, Birch, Swindler, McKie & Beckett

[57] ABSTRACT

A process is disclosed for forming bonded fibre and fibre products by utilisation of an improved process for neutralising the catalyst employed in forming the A stage phenol-aldehyde resin or condensate. This condensate is the actual bonding agent which, when incorporated in a diluted form in a binder composition and sprayed onto the fibres and subsequently heated in an oven, cures and bonds the fibres to one another. The condensate is a phenol-aldehyde condensate which is the result of reacting a phenol and an aldehyde in the presence of an alkali metal or alkaline earth metal hydroxide as catalyst to form an A stage or resole resin. The catalyst, once the reaction has been completed, is then neutralised, either before or after dilution, with an acidic lignosulphonate, or a liquor containing such material. An organic or mineral acid can be utilised in conjunction with the lignosulphonate, or lignosulphonate liquor, so as to avoid adding excessive amounts of lignosulphonate. The invention is also directed to the novel processes for forming the resin and binder composition disclosed.

38 Claims, 1 Drawing Figure

U.S. Patent  Jan. 27, 1976  3,935,139

BINDER COMPOSITIONS

BACKGROUND TO THE INVENTION

Figure 1:
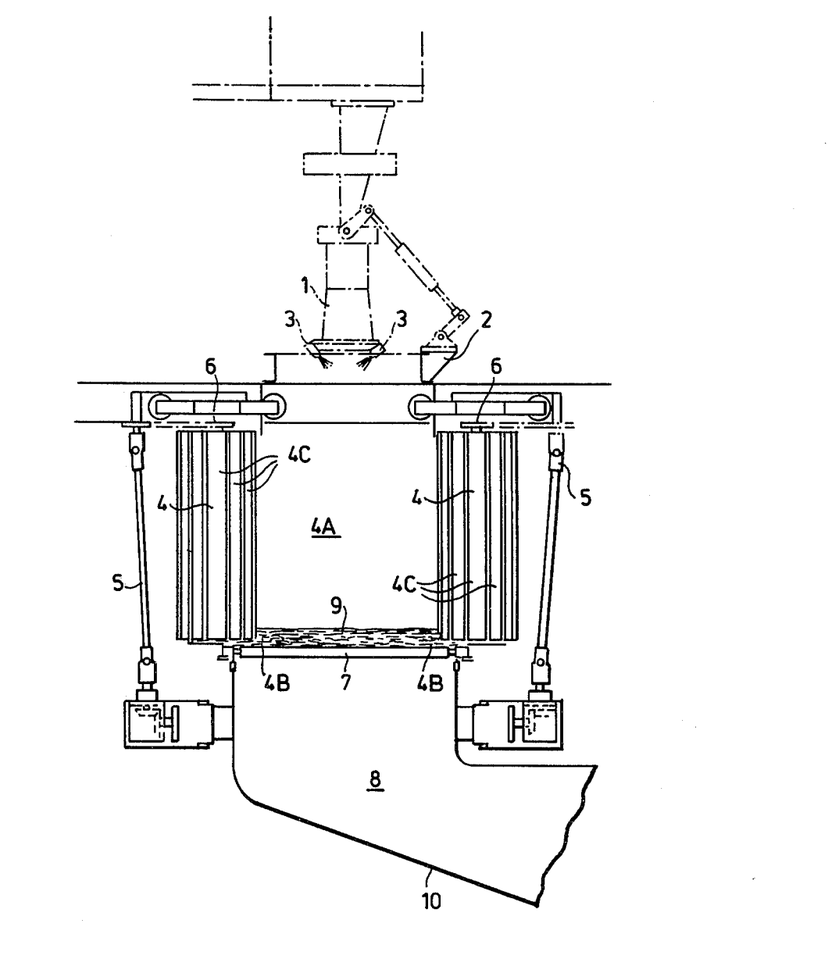

This invention relates to improvements in the production of alkaline catalysed phenol-aldehyde condensates of the kind used in bonding together fibres such as mineral wool or glass fibres, and to binder compositions based on such condensates. The invention also relates to bonded fibre products and to processes for producing such products in which the binder composition used is produced by the novel process of the present invention.

One conventional process for forming fibres of glass or other heat-softenable material, called the rotary process, involves delivering heat-softened or molten glass into a hollow spinner or centrifuge provided with a comparatively large number of orifices in the peripheral wall of the spinner. High speed rotation of the spinner delivers the softened or molten glass through the orifices by centrifugal force. Bodies, streams or primary filaments of glass are produced which are engaged by an annularly-shaped gaseous blast and thereby attenuated into fibres which are entrained in the blast in the form of a hollow beam or column of fibres.

In the fibre-forming operation it has been a usual practice to deliver or apply an uncured binder, such as a phenol-formaldehyde condensate in solution or dispersed form, to the newly attenuated fibres at a region below the attenuating region so that the fibres are sprayed with the uncured binder. Fibres of this character are collected in a mass upon a moving conveyor. The thickness of the mass is controlled to provide a fibrous mat which is conveyed or passed through an oven or curing zone for setting the binder in the mat.

The descending fibres at the region of application of the binder are at a temperature of 500° to 600°F or more even though the zone of application of the binder onto the fibres is substantially below the attenuating region. The prior art suggests that cooling of the fibres may be accomplished by spraying the attenuated fibres with a vaporizable medium, such as water, prior to the application of the binder resin. Volatilization of the water into steam and subsequent discharge of the steam into the atmosphere is either non-objectionable or easily reducible. However, even when the binder is applied to fibres at such a lowered temperature, there is appreciable vaporization of the volatile organic constituent of the binder. These organic vapors when cooled condense into a plume (liquid droplets) which is similar to the mechanism of water vapor condensation into a steam plume. Although the effluent may be washed and filtered, at least some of the volatile material and some binder particles or solids are discharged into the atmosphere through a discharge stack connected through a suction blower arrangement beneath the region of collection of the fibres on the conveyor. As much as 30 percent or more of the binder has been lost in the past through volatilization during application and curing. Because of environmental considerations, discharge of this vapor into the atmosphere is objectionable. Use of the binder of the present invention provides a reduction in the free phenol in the solids discharge stack and wash water, due to reduction in the quantity of phenol used to obtain the same binder efficiency and, we believe, due to the presence of the lignosulphonate particularly when added to neutralise the catalyst.

The preparation of a binder composition for application e.g. to glass fibres in the manner described above has been a subject of a series of developments over the period since about 1945. As disclosed in e.g. U.S. Pat. No. 3,704,199 for many years, the alkaline catalyst used in forming the A stage or resole resin was a strong alkali such as sodium hydroxide or potassium hydroxide. It was necessary to neutralise the alkaline catalyst after the resole had been formed to avoid the resole advancing to the final resite or infusible stage, and this resulted in the formation of water-soluble salts. Such salts were believed to cause a deterioration in the final production particularly under humid conditions due to a fall in the strength of the binder. The system developed originally to combat this problem was to remove the salts of neutralisation, e.g. by an ion-exchange treatment. That is described e.g. in U.S. Pat. No. 2,758,101.

It was then found that one could avoid the use of materials likely to produce free sodium or potassium ions in the product by utilising as a catalyst barium hydroxide. The process utilising barium hydroxide is disclosed e.g. in U.S. Pat. No. 3,704,199. As indicated in that specification such a catalyst when neutralised with sulphuric acid forms particles of barium sulphate which when left in situ does not have any deleterious effect on the weathering properties of the glass fibre product.

As indicated above, the application of the binder is carried out under conditions where not all the material leaving the spraying equipment is actually utilised on the product. The actual level of binder required on the product can in some cases be as low as 3% and can in certain products approach 30%. Thus the binder in terms of raw materials cost forms a substantial part of the raw materials cost, therefore reduction in raw materials cost, along with improved efficiency of application of binder are desirable goals. Any change in binder composition must of course be made without any fall below a desired standard in the effectiveness of the performance of the binder. Our earlier U.K. Patent Specification Nos. 1,316,911 and 1,293,744 describe how it is possible to utilise lignosulphonates as binder extenders, in addition to their function with urea in obtaining a controlled setting time for the binder. Utilisation of lignosulphonates in the manner described in these specifications has enabled considerable cost savings to be made by reduction in the quantity of phenol used.

With increasing shortages of materials and rising costs, and with increased demand for insulation materials so as to conserve energy, it is desirable that the cost of the binder applied to the fibre should be reduced, or the rise in cost kept as low as possible. This is particularly important in the case of glass fibre wool mats which are used for domestic and industrial insulation. At least two of the raw materials which have been almost standard in their use to produce a high grade product, phenol and barium hydroxide, have been the subject of major changes in cost and availability. One approach to reducing cost is therefore to reduce the use of phenol and this has been done as described in U.K. Patent Specification Nos. 1,316,911 and 1,293,744. A further approach would be to utilise cheaper grades of phenol and/or cheaper and more readily available catalysts such as sodium hydroxide and calcium hydroxide.

The use of cheaper grades of phenol such as those obtained from tar distillates means that small quantities of materials such as cresols are present in the raw material. Their presence in the condensate when diluted to form the binder when such a source of phenol is used in the conventional process results in the cresol condensates with formaldehyde separating and interfering with the properties of the final binder. As indicated above, sodium hydroxide has only been used in conjunction with a further process for the removal of the salts formed during the neutralisation stage. The precipitation of calcium hydroxide with sulphuric acid results in the formation of particles with a size in the range up to 20 microns, such particles cannot be allowed to remain in the final product at that size and must be separated in introducing a further expensive stage into the preparation of the resin. U.K. Patent Specification No. 1,285,938 suggests that the precipitation of calcium ions with sulphuric acid, phosphoric acid or their ammonium salts can only be accomplished with dilute solutions of these acids or their salts, and that this results in the production of large volumes of dilute resins which are uneconomical in industrial practice. That specification suggests the utilisation of a buffering effect to solve the problem i.e. the use of an alkaline solution of a soluble acidic ammonium salt having an anion which forms an insoluble salt with calcium.

We have now found that we can considerably reduce our binder costs by either utilising a cheaper catalyst such as sodium hydroxide or calcium hydroxide in conjunction, if desired, with a cheaper source of phenol or, if desired, continue to use barium hydroxide with a cheaper source of phenol. We have found that we can operate in these ways while avoiding the problems of the prior art i.e. weathering in the case of sodium hydroxide, particle separation in the case of calcium hydroxide and separation of cresol condensates when using cheaper phenol sources by wholly or partially replacing the organic or mineral acids used to neutralise the resin at the end of the A stage condensation by an acidic lignosulphonate or a liquor containing such a material. We have thus discovered how to utilise materials previously believed to be impossible to use without accepting a considerable deterioration in product quality. We can achieve a product quality within a range acceptable in the marketplace using a cheaper and more readily available catalyst either with synthetic phenol or a phenol source containing impurities. The use of lignosulphonates when applied to neutralise the catalyst either at the end of the formation of the condensate before dilution to form the binder, or during the dilution, also appears to reduce the loss of resin during the subsequent application of the binder composition to the fibre giving increased efficiency of application. Such efficiency is measured by determining the binder solids sprayed and the binder retained on the product, and calculating the percentage retained.

Utilising lignosulphonates in the manner described in this specification, we obtain improved efficiencies of the order of 80% compared with around 62% previously obtained in the conventional process, or around 72% when lignosulphonates are simply added at the binder mixing stage to a resin neutralised by sulphuric acid.

The term "lignosulphonate" is used to refer to the material produced as a by-product in the digestion of wood pulp. During this digestion with an inorganic bisulphite, lignosulphonates are formed, and some of the hemi-cellulose is converted to carbohydrates. The liquor formed may be spray-dried to give a solid material, or concentrated to a liquor of a particular solids concentration. In some cases, a purer material is formed by separating the carbohydrate or sugar material from the crude liquor. The lignosulphonate in liquor form is also known as "waste sulphite lye". Lignosulphonates can be obtained readily in solid or liquid form, and are derived from the use of one of the following bisulphites: ammonium, calcium, magnesium and sodium. The lignosulphonate when dispersed in water will normally give an acid pH, and can therefore be used in the neutralisation of the alkaline catalyst in the aqueous solution of a phenol-formaldehyde condensate. Some lignosulphonates formed by the use of sodium bisulphite are in fact alkaline and cannot be used in the process of this invention.

The assessment as to whether a particular lignosulphonate source can be used as a neutralising agent will of course depend on its acidity. This can be measured in terms of the acid equivalent, in other words the quantity of $SO_3H$ groups present in the sulphonated molecules e.g. the reported acid equivalent value for a commercial source of ammonium lignosulphonate sold under the trade name Totanin is 400 to 500. We find that we can select suitable materials by measuring the pH value of solutions of the lignosulphonate material made up so as to contain 10% solids. The values obtained will vary according to the source, and in some cases, with changes in the nature of the wood being pulped. It is clearly impossible with a natural raw material made under varying conditions to define completely all the possible variations but as a general guide, we find it preferable to select a source which provides a material which in the form of a solution containing 10% solids has a pH in the range 3.5 to 4.5. This does not mean that materials outside this range cannot be used as long as they are acidic, but problems may be encountered in combating the effect of either too little or too much lignosulphonate material in the final binder composition, with a resultant effect on the binder setting time.

SUMMARY OF THE INVENTION

In its broadest aspect, our invention is directed to a process for forming a binder composition (of the kind described above) in which an A stage phenol-aldehyde condensate is used as the resin in the binder and is produced in the presence of an alkali metal or alkaline earth metal hydroxide ad catalyst and t he catalyst is neutralised by an acidic material characterised in that the acidic material used to neutralise the catalyst is an acidic lignosulphonate, additional acidic material as free acid being added when necessary to complete the neutralisation.

Neutralisation of the catalyst is normally carried out prior to dilution of the condensate to form the binder composition, and the neutralisation step of this invention can be carried out at that stage. The dilution of the condensate with water to form the binder composition, is normally referred to as the binder mixing stage. Various additives can be added at this stage e.g. silanes as coupling agents, urea as an extender, mineral oils as fibre lubricants and ammonium sulphate. We have found that the utilisation of a lignosulphonate material wholly or partially as the neutralising agent enables the resin to be added at the binder mixing stage to the binder mixing vessel in an un-neutralised form and the catalyst to be neutralised during such mixing. We find it essential when using phenol containing impurities to form the resin to ensure that the acidic lignosulphonate is added before the dilution of the resin with water.

Our invention therefore also includes a binder composition for glass fibres in which the catalyst present during the formation of the binder resin has been neutralised wholly or in part by an acidic lignosulphonate material.

There is also further provided, in our present invention, in a process for forming an aqueous solution of an A stage phenolic condensate, which process comprises the steps of first reacting a phenol with formaldehyde (the formaldehyde being an aqueous solution) in the presence of an alkali metal or alkaline earth metal hydroxide as catalyst, and secondly when reaction to the A stage is completed of neutralising the reaction mixture to a pH in the range 6.5 to 7.5 with a mineral or organic acid, the improvement of wholly or partially replacing the mineral or organic acid with an acidic lignosulphonate or liquor containing such material.

The invention is applicable not only to the neutralisation of the alkaline catalyst used during the simple condensation of a phenol with an aldehyde, but also to the amino-plasts formed in the presence of one or more amino-compounds. The terms "phenol-aldehyde condensate" and "phenol-formaldehyde condensate" when used in this specification are therefore used to refer also to these other condensates which are also sometimes referred to as co-polymer or ter-polymer resins.

We prefer to utilise an ammonium lignosulphonate in solid of liquor form as the acidic lignosulphonate, as using such a material one can dispense, if desired, with the normal further addition of ammonium sulphate to the binder composition. Ammonium sulphate is added at this stage to assist the further curing of the binder.

According to another aspect of our invention, there is provided a process for manufacturing a binder composition for glass wool fibres, which contains as a resin in the binder a phenol-formaldehyde condensate, in which the resin is added to a vessel in which the binder is mixed, in an un-neutralised state, and is neutralised while the binder is being mixed wholly or partially by the presence of an acidic lignosulphonate, or a liquor containing such a lignosulphonate.

Our invention also results in an improved method for producing a glass fibre product which includes the steps of flowing a plurality of streams of molten glass, attenuating the streams to a desired fibre diameter by means of a high velocity gaseous blast, projecting the fibres onto a conveyor, treating them with a binder composition (before they are collected on the conveyor), and conveying the collected fibres and associated binder through a curing stage the resultant cured binder bonding the fibres to one another at points of contact, an alkaline catalyst having been used in forming the binder resin, characterised in that an acidic lignosulphonate is utilised in the neutralisation of such catalyst.

The lignosulphonate can either be added as a powder, or in the form of a concentrated solution in water (we prefer when using a solution to use a concentration of the order of 50% wt solids). The quantity used should be such that in the final binder solution the % of the solids content of the binder due to lignosulphonate should not fall below 10% nor exceed 20%, all percentages being based on the binder solids content equalling 100%.

Calcium lignosulphonate can be obtained in the form of a liquor containing 53% solids and is supplied under the description calcium lye by A/S Toten Cellulosefabrik, Nygard St., Oslo, Norway. It is also available in powder form.

Magnesium lignosulphonate can be obtained in solid form, or as a liquor.

In the case of sodium lignosulphonate as well as ensuring that the material has an acid pH, it is also essential that the concentration of sodium ions in the material should be less than 20% (measured on 100% solids), so as to avoid any subsequent effect on the weathering properties of any product formed using a binder formulated with a resin treated with the lignosulphonate.

We have measured the pH values of solutions containing 10% solids of various available sodium lignosulphonates, and the sodium ion concentration of the same materials as % on 100% solids obtaining the following results

|  | pH | Na ion Concentration % on 100% solids |
|---|---|---|
| Source A (53% solids liquor) | 4.3 | 9.4 |
| Source B (15% solids liquor) | 1.5 | 12.8 |
| Source C (8% solids liquor) | 7.5 | 27.0 |

It is clear that a lignosulphonate such as that obtainable from source C is not an acidic lignosulphonate for use in the process of the present invention as it has a pH of 7.5. The apparent anomaly between sources A and B that the material with a lower pH has a higher sodium ion concentration is due to the difference in numbers of —$SO_3H$ groups. Even more care is needed in selecting a suitable sodium lignosulphonate if sodium hydroxide is to be used as catalyst for the condensation. It is essential that the final total of sodium ions as % on 100% binder solids does not exceed 20% and is preferably substantially less than 20%. This means that source A would be preferred.

The lignosulphonate as indicated above can be used as a whole or partial replacement for mineral or organic acids as can the preferred ammonium lignosulphonate.

We prefer to avoid the use of an acid such as sulphuric acid when using calcium hydroxide as a catalyst so as to avoid the formation of large particles of calcium sulphate even though with partial replacement with an acidic lignosulphonate, the quantity of this material formed will be reduced, and the lignosulphonate will act as a dispersing agent. As indicated in U.K. Patent Specification No. 1,285,938 phosphoric acid can be convenient to use because of its beneficial effect on curing characteristics. The strong mineral acids in general should be used with care as they can cause degradation of the resin.

The quantity of lignosulphonate used can be conveniently chosen on the basis of its subsequent presence in the binder solution as a binder extender and as indicated above we prefer to use sufficient lignosulphonate to give in the final binder solution not less than 10% of the final binder solids content. As described in our U.K. Patent Specification No. 1,316,911 and 1,293,744, the use of a combination of urea and a lignosulphonate in the binder solution can enable one to control the binder setting or gel time. The choice of how much free acid can be replaced by an acidic lignosulphonate can therefore be based on the quantity of lignosulphonate desired in the final binder composition. If e.g. the binder composition contains 15% solids, and of this 15% solids urea is e.g. 5%, the resin is 75% and the lignosulphonate is 20%, then sufficient lignosulphonate must be added at the neutralisation stage to achieve this in the final product. In the case where this is insufficient to bring the pH to a value in the desired pH range e.g. 6.5 to 7.5 then a free acid such as phosphoric acid is added to achieve the final adjustment of pH.

On the other hand, if the required amount of lignosulphonate will result in a pH below 7.5 there is no need to add free acid to obtain the correct pH. We prefer to avoid adding to the binder composition an amount of lignosulphonate equivalent to more than 20% of the solids content of the binder mixture.

The A stage condensate can be a partial condensation product of any suitable phenol with any suitable aldehyde. A stage condensates or resoles are discussed in Martin, The Chemistry of Phenolic Resins, John Wiley & Sons, New York 1956. As an A stage condensate or resole curable to an infusible material is needed, phenol itself i.e. hydroxy benzene is preferably employed. Formaldehyde is preferred as the aldehyde because of the greater simplicity of its chemical reactions with a phenol and for economic reasons.

The mol ratio of phenol to formaldehyde is preferably chosen in the range 1 mol phenol to 2 to 3.7 mols formaldehyde, the upper end of the formaldehyde range being used when other reactants such as urea and/or dicyandiamide are present in the reaction mixture. We prefer to avoid an excess of formaldehyde and to keep as low as possible the quantity of phenol present in the final binder composition formed from the resin. The quantity of catalyst required is conveniently based on the quantity of phenol used, and will vary according to the alkaline catalyst chosen e.g. in the case of barium hydroxide, the range can be 4% to 12% and calcium hydroxide ½% to 4% and sodium hydroxide 1% to 4%. We have found that utilising a lignosulphonate material at the binder mixing stage to both neutralise and extend the resin, makes it feasible to use on a regular commercial scale if desired, sodium hydroxide as a catalyst, despite the fact that as indicated above, this material is usually avoided on a commercial scale. We believe that the presence of the lignosulphonate material, and the relatively smaller quantities of phenol used in forming the resin, have substantially removed the problems previously associated with the use of sodium hydroxide in forming the resin to be used in making binders for glass wool products.

Our development work using lignosulphonates as extenders and modifying materials for sodium catalysed A stage phenol formaldehyde resins has shown that these lignosulphonates appear to behave as sequestering agents for the sodium ion in the mixed binder solution.

In order to demonstrate that sodium hydroxide can be used satisfactorily two binders have been prepared based on a sodium hydroxide catalysed resin. In one case the resin is neutralised with totanin and in the other with sulphuric acid. Rod adhesion tests carried out in the manner described below gave the following results.

| | Initial Adhesion Grammes | After Humidity Grammes |
|---|---|---|
| Sodium Catalysed A stage phenol formaldehyde resin - alone | 246 | 193 |
| Sodium Catalysed A stage resin 60% + Totanin 40% | 344 | 232 |

It can be seen that the use of Totanin to neutralise the catalyst has depressed the effect of the sodium ions, in addition these tests were carried out in the absence of silane.

We have found that the weathering properties of the material tends to become unsatisfactory if the pH is approaching neutral or on the alkaline side of neutral.

A single hole alloy crucible containing molten glass is used to draw a monofilament by means of a drum rotating at 3000 r.p.m. The temperature of the bushing is allowed to rise to such an extent that the diameter of the fibre is equal to 0.004 inch (keeping the glass level in the bushing constant). The fibre is then drawn over a pad onto the drum so that a series of bundles or rods containing 3000 fibres is made. The pad is kept moist by spooning the resin mix onto it. For each binder mix 10 rods are run. The rods are taken off the drum, dipped in the binder mix and then left to drip for an hour. The rods are then cured in an oven at 220°C for 5 minutes. They are then divided into two, one half is reversed and then cut into two halves. One half is tested to find the breaking strengths of the rods. 15 readings are taken and the average is noted. The other half of the rods are put into a humidity cabinet for 1 hour. The temperature of the cabinet is 50°C and a tray in the bottom of the cabinet contains a saturated solution of potassium sulphate. The breaking strength of these rods is then determined, again 15 readings are taken and the average is noted. The % difference between the breaking strength of the unweathered sample and that of the weathered sample is known as the % weathering loss.

Comparative rod adhesion tests on various forms of sodium lignosulphonate waste liquor showed that the more concentrated material was the best source, but other sources could provide useable material, but that the material containing 27% sodium ion (based on 100% solids) was inferior in performance to the other materials.

The above figures have been obtained at the same binder content without the addition of coupling agents (silanes) added to the binder in the normal way. Without these materials the bond is more subject to humidity attack.

As indicated above phenol can be used in the form of a crude material containing cresols as impurities. One such material had the following analysis.

| Phenol | 81% |
|---|---|
| O-Cresol | 15% |
| m/p Cresol | 3% |
| unidentified | 1% |

We believe that utilising lignosulphonate material at the neutralisation step makes it possible to use similar materials to the above as a phenol source. They can of course be used blended with synthetic phenol to reduce the amount of impurity. Care should be taken to evaluate each source on its merits in case trace materials may interfere with the bonding properties of the eventual binder composition e.g. high levels of cresylic acid must be avoided.

The actual conditions chosen for the formation of an A stage condensate of a phenol and an aldehyde are well known in the art.

The condensation reaction is normally carried out by heating the reactants together under agitation, the heating being for several hours at a series of increasing temperatures e.g. 2 hours at 110°F, 2 hours at 137°F and finally 1 hour at 147°F. The procedure in U.K. Patent Specification No. 932,690 is 3 hours at 110°F, 4 hours at 125°F, and 6 hours at 140°F. In the case of calcium hydroxide due to the exothermic nature of the reaction, as indicated in U.K. Patent Specification No. 1,285,938 the reactants without the catalyst may be first heated to about 100°F and then allowed to rise to 125°F over 60 minutes, the CaO being added over 15 minutes. The subsequent reaction conditions in U.K. Patent Specification No. 1,285,938 were then similar to those used with other catalysts.

In order to illustrate the neutralisation step of the present invention, a series of A stage resin condensates were prepared. The condensates illustrate the preparation of both simple phenol formaldehyde condensates and co-polymer condensates in the presence of urea. Condensates were prepared using as catalyst, barium hydroxide, sodium hydroxide, calcium hydroxide.

Condensate I

The mol ratio of the reactants used was as follows:

| | |
|---|---|
| Phenol | 1 mol |
| Formaldehyde | 2.7 mol |
| Polyethylene glycol (as Union Carbide Carbowax 600) | 0.005 mol |
| Urea | 1 mol |
| Barium hydroxide | 0.045 mol |

In making up the condensate the following quantities of reactants were used:

| | |
|---|---|
| Phenol | 230 gallons |
| Formaldehyde 37% w/w | 500 gallons |
| Urea | 1530 lbs |
| Polyethylene glycol (Carbowax 600) | 78 lbs |
| Barium hydroxide pentahydrate | 300 lbs |

The phenol and formaldehyde were mixed together in a reaction vessel, and the catalyst added. The reaction was allowed to proceed at 115°F for 2 hours. The temperature was then raised to 145°F for 2 hours. The polyethylene glycol was then added. The temperature was then raised to 165°F and the reaction mixture held at that temperature for 1 hour. The urea was then added over 15 minutes, and the reaction continued at 165°F for a further 30 minutes. The condensate is then cooled to 100°F for neutralisation.

Condensate II

The mol ratio of reactants used was
1 mol phenol
2.05 mols formaldehyde
0.045 mols barium hydroxide pentahydrate
In making up a batch of resin the following quantities of reactants were used.

| | |
|---|---|
| Phenol | 168 gallons |
| Formaldehyde 37% w/w | 284 gallons |
| Barium hydroxide pentahydrate | 230 lbs |

The catalyst was added to the phenol and formaldehyde mixture in a reaction kettle, and the temperature raised to 110°F for 2 hours. The temperature of the reaction mixture was then raised to 137°F for 2 hours and after that time to 147°F for 1 hour. The condensate formed is then cooled to 100°F for neutralisation.

Condensate III

A condensate was prepared usingn reactants in the following mol ratios:
1 mol Phenol
1 mol Urea
2.7 mols Formaldehyde 37% w/w solution
0.7 mol Ca (OH)$_2$
In making up a batch of resin the following quantities of reactants were used:

| | |
|---|---|
| Phenol | 200 gallons |
| Formaldehyde | 440 gallons |
| Urea | 1340 lbs |
| Ca(OH)$_2$ | 115 lbs |

The phenol and formaldehyde were mixed in a reaction kettle provided with cooling means. The catalyst was added and the heat produced by its addition absorbed by cooling. Once all the catalyst had been added the temperature was raised to 115°F, and held at that temperature for 2 hours. The temperature was then increased to 145°F for 2 hours, and then to 165°F for 1 hour. At this point the urea was added and the temperature held at 165°F for a further 30 minutes. The resin was cooled to 100°F for neutralisation.

Condensate IV

A condensate was prepared using reactants in the following mol ratios:
1 mol Phenol
2.7 mols Formaldehyde
1 mol Urea
0.045 mol Sodium hydroxide
In making up a batch of resin the following quantities of reactants were used:

| | |
|---|---|
| Phenol | 345 gallons |
| Formaldehyde | 750 gallons |
| Urea | 2,300 lbs |
| NaOH (46% solution) | 10 gallons |

Same reaction cycle as condensate III.

Condensate V

A condensate was prepared using reactants in the following mol ratios:
1 mol Phenol
3.2 mols Formaldehyde
0.045 mol Sodium hydroxide
In making up a batch of resin the following quantities of reactants were used:

| | |
|---|---|
| Phenol | 255 gallons |
| Formaldehyde | 660 gallons |
| NaOH (46% solution) | 7.5 gallons |

The phenol and formaldehyde were mixed in a reaction kettle provided with cooling means. The catalyst was added and the heat produced by its addition absorbed by cooling. Once all the catalyst had been added the temperature was raised to 110°F and held at that temperature for 2 hours. The temperature was then increased to 145°F and held for 2 hours then raised to 167°F and held for 1½ hours. The resin was then cooled for neutralisation.

The following examples illustrate but do not limit the invention. The pH values for the lignosulphonates are as measured for a 10% solids solution.

EXAMPLES

Examples I to V illustrate the neutralisation of the alkaline catalyst at the end of the condensation and before dilution to form the binder composition. In all cases the condensates after neutralisation utilising an acidic lignosulphonate as the sole acidic material or in conjunction with a free acid as indicated in the examples were used to make up a binder composition for application to glass wool. The performance of the final product was in all cases comparable to that obtained when using as a binder composition one in which the resin had been prepared in the presence of barium hydroxide, and sulphuric acid used as a neutralising agent for the catalyst.

EXAMPLE I

All three resins as prepared above were treated with an ammonium lignosulphonate known under the trade name "Totanin" with a pH 3.5. The neutralisation was carried out so as to achieve a pH of 7.2. The quantity used in each case was calculated so as to achieve in a final binder composition a solids content made up of 70% resin, 15% lignosulphonate and 15% urea, the urea being added at the stage of mixing the binder. It was found that the quantity of lignosulphonate needed to achieve this solids content in the binder composition was of the order of 870 lbs made up as a 50% solution in water. In each case the ammonium lignosulphonate was added to the condensate ready for neutralisation, the pH was then checked and found to be of the order of 7.7 and the final adjustment to pH 7.2 was made by adding phosphoric acid. The appearance of the neutralised condensate solution after being allowed to stand for 120 hours at 40°F is indicated in the table below:

| | |
|---|---|
| Condensate I | Stable solution no precipitation |
| Condensate II | " |
| Condensate III | " |

EXAMPLE II

The experiments of Example I were repeated replacing ammonium lignosulphonate with calcium lignosulphonate liquor having a pH of 4.6, and the results obtained showed no difference in performance. The liquor was of 53% solids liquor and the quantity used was of the order of 1640 lbs of that liquor. Phosphoric acid was again used for the final adjustment.

EXAMPLE III

The experiments of Example I were repeated using magnesium lignosulphonate in place of ammonium lignosulphonate in the form of a liquor having a pH of 4.7. The quantity required was 1740 lbs of a 50% solids solution, and the results obtained indicated a performance of the same order as that obtained with ammonium lignosulphonate in Example I. Phosphoric acid was used for the final adjustment.

EXAMPLE IV

The experiments of Example I were repeated using a sodium lignosulphonate liquor having a pH of 2.7 in place of ammonium lignosulphonate The quantity required was of the order of 1740 lbs of a 50% solids solution and the results obtained were satisfactory. Phosphoric acid was again used for the final pH adjustment.

EXAMPLE V

Example I was repeated with one small change, namely the substitution of organic acids for phosphoric acid. It was found using both formic and acetic acid that each resulted in a slight deposit on standing. The deposit however was less than the quantity that would remain in suspension during further processing, and application to the product.

Examples VI to IX illustrate the neutralization of the alkaline catalyst at the binder mixing stage. There are two procedures for mixing a binder, one illustrated in Example VI and the other in Example VIII. As in the case of Examples I to V application of the binder compositions prepared in this manner to glass wool to form a bonded product resulted in a product of a comparable standard.

EXAMPLE VI

In the formation of a binder according to the invention a resin was first prepared as in Condensate II. The quantity used in the binder was calculated to achieve in the final bonding solids composition a proportion of resin 70%, lignosulphonate 15% and urea 15%. The resin can be neutralised with lignosulphonate prior to binder manufacture in the proportion equivalent to the above ratio found in the final binder composition, or alternatively the individual batch quantity of un-neutralised resin may be neutralised at binder manufacture as illustrated below. The ammonium lignosulphonate is in the form of a liquid, either Totanin dissolved in water or a lye of 50% solids content.

The quantities of materials used in making up one batch of binder are as follows:

| | | |
|---|---|---|
| 45 gallons | resin | 540 lbs |
| 9 gallons | ammonium lignosulphonate solution (50% solids) | 112 lbs |
| 3 gallons | ammonium solution SG 0.880 | 26 lbs |
| 5 oz | A1120 silane (Union Carbide) | 0.31 lb |
| 56 lb | urea powder | 26 lbs |
| 10 gallons | emulsified oil (40% concentrate) | 90 lbs |
| 240 gallons | make-up water | 2400 lbs |

Such a binder comprises 12% by weight of solids of which 70% is resin, with 15% ammonium lignosulphonate and 15% urea.

The binder cmposition was prepared as follows:

A mixing tank with a propeller-type agitator was charged with 45 gallons resin prepared as Condensate III. To this was added 9 gallons ammonium lignosulphonate solution (50% solids). To this was further added the ammonia solution and the silane solution as set out in the formulation. A separate mixing vessel with propeller-type agitator was charged with 240 gallons of water and to this was added 56 lb urea powder. The contents of the first tank containing the resin and additives was then transferred to the second tank containing the diluent water. Finally, when the two solutions were mixed 10 gallons of emulsified mineral oil was added. The binder pH was 9.5 and the binder comprised 12% by weight of solids of which 70% was resin with 15% ammonium lignosulphonate and 15% urea. This method of mixing must also be used with a resin containing crude phenol as illustrated in Example X.

EXAMPLE VII

Similar results are obtained using a resin prepared as Condensate I or Condensate IV.

EXAMPLE VIII

A further binder can be prepared using the Condensate V neutralised with lignosulphonate as described in Example I. The binder composition was prepared as follows:

A mixing tank with a propellor-type agitator was charged with 45 gallons resin prepared as Condensate V. To this is added ammonia and silane solutions. A separate mixing tank with propeller-type agitator was charged with 288 gallons of water and to this was added 62 lb urea powder followed by 27 gallons of ammonium lignosulphonate solution (50% solids). The contents of the first tank containing resin was added to the second tank and finally the addition of 10 gallons emulsified oil. The binder pH was 8.4 and the binder comprised 12% by weight of solids of which 45% is resin with 40% ammonium lignosulphonate and 15% urea. The quantities of material used for one binder batch are as follows:

| | | | |
|---|---|---|---|
| 45 gallons | resin | 510 | lbs |
| 27 gallons | ammonium lignosulphonate solution (50% solids) | 328 | lbs |
| 3 gallons | ammonium solution SG 0.880 | 26 | lbs |
| 5 oz | A1120 silane (Union Carbide) | 0.31 | lb |
| 62 lbs | urea powder | 62 | lbs |
| 10 gallons | emulsified oil (40% concentrate) | 90 | lbs |
| 288 gallons | make-up water | 2880 | lbs |

Such a binder comprises 12% by weight of solids of which 45% is resin with 40% ammonium lignosulphonate and 15% urea.

EXAMPLE IX

This example illustrates the use of a source of phenol having the following analysis by fractional distillation:

| Fraction | |
|---|---|
| Water | 9% |
| Phenol | 57% |
| Cresols | 23% |
| Residual Tars | 11% |

Two resins were made using this material replacing part of the synthetic phenol used with the crude material. In the case of the first resin, the quantities used were as follows:

| | | |
|---|---|---|
| Phenol | 0.8 moles | 10.4 gallons |
| Formaldehyde (37% solution) | 2.7 moles | 28.5 gallons |
| Crude phenol | 0.2 moles | 2.6 gallons |
| Urea | 1 mole | 87 lbs |
| Calcium hydroxide | 0.079 moles | 8 lbs |
| Ammonium lignosulphonate | | 56 lbs |

The catalyst was added to the formaldehyde, phenol and crude phenol and the following heating cycle used:
2 hours at 46°C
2 hours at 63°C
1 hour at 74°C The urea was then added to the reaction mixture over 15 minutes, and the reaction mixture then held at 74°C for 30 minutes. The ammonium lignosulphonate was then added as the resin cooled. The resin was used to form a 12% binder composition and compared in the rod adhesion test with a standard binder made solely with synthetic phenol. The results were as follows:

| Binder | Before Weathering | After Weathering | Loss | Binder Content | Gel Time |
|---|---|---|---|---|---|
| Standard Binder as described in Example I of U.K. 1,316,911 except the calcium lignosulphonate was replaced by Ammonium lignosulphonate. | 426 gms | 417 gms | 2.1% | 6.6% | 197 secs |
| Binder using some crude phenol(A) | 449 gms | 445 gms | 1.0% | 6.6% | 172 secs |

The second resin was made in a similar manner, except the crude phenol content was increased to 0.4 mols 5.6 gals, and the synthetic phenol content reduced to 0.6 mols 8.4 gallons. The results of the rod adhesion test were

| Binder | Before Weathering | After Weathering | Loss | Binder Content |
|---|---|---|---|---|
| Standard | 404 gms | 407 gms | 0% | 5.4% |
| Binder using some crude phenol (B) | 415 gms | 411 gms | 1.0% | 6.1% |

The first resin when used in a binder applied to glass fibre gave the following results for parting strength (compared with a standard binder):

| Binder | Parting Strength Before Weathering | After Weathering | Strength Loss | Binder Content |
|---|---|---|---|---|
| Standard binder as described above. | 0.57 lb/gm | 0.38 lb/gm | 31.7% | 6.2% |
| Binder using crude phenol (A) | 0.60 lb/gm | 0.31 lb/gm | 48.0% | 5.2% |

The binder in which a crude phenol source has been used in forming the resin for the binder can be seen to produce when applied to glass fibres a product whose strength before and after weathering is at an acceptable level since the weathering loss in an acceptable product should always be less than 50%.

It was found impossible to produce a resin using the above source of phenol with conventional methods of neutralising the catalyst, as the water tolerance of the resin was not satisfactory. By water tolerance is meant the amount of resin that can be diluted with water before separation of resin occurs, the figure is given in terms of the maximum amount of water which can be added to 10 parts of resin e.g. 10 parts of resin to 20 parts of water giving a total of 30 parts and is known as a dilution of 10/30. It was found that in comparison with the present acceptable level for a standard resin of 10/30, a resin incorporating 20% crude phenol of the above analysis when neutralised with sulphuric acid had a dilution of 10/20 i.e. the maximum amount of water which could be added to 10 parts of resin was 10 parts of water, but when neutralised at the end of the A stage condensation with lignosulphonate, had an infinite dilution i.e. the resin was totally mixable with water at any concentration needed.

The production of glass fibres bonded with the binder compositions of the invention may be carried out in apparatus of the kind illustrated in the attached drawing. The arrangement used to feed and fiberise the glass is now shown, but the fibres are produced by feeding a stream of molten glass in a conventional manner to a spinner which is rotated so that the molten glass is forced against an orificed peripheral wall of the spinner by centrifugal force, so that the molten glass is extruded through the orifices in the wall. The spinner is surrounded by an annular combustion chamber which is shaped so as to direct hot gases from the combustion downwardly across the peripheral wall. The hot gases maintain the extruded streams of glass in a softened condition. A high velocity stream blast is also directed at the streams of glass so as to attenuate them into fine fibres. The attenuated fibres fall below the spinner in the form of a hollow or tubular veil and pass down into a fibre distributor 1, which is oscillated to and fro by an oscillating mechanism 2. The fibres fall past spray guns 3 which spray the binder composition on to the falling fibres. The fibres fall between movable walls 4 through a space 4A onto a conveyor 7 which moves in a direction at right angles to the plane of the drawing. A mat 9 of fibres is formed on the conveyor, the oscillation of the fibre distributor 1 ensuring that the fibres are distributed uniformly across the conveyor. A housing 10 is located below the conveyor forming a suction chamber 8. The mat of binder-coated fibres collected on the conveyor is usually at a temperature of between 200° to 250°F and before coating with the binder composition is perhaps at a temperature of about 500° to 600°F. At such temperatures some of the binder resin tends to decompose on contacting the fibre, and the reduced amount of phenol in the resin and the presence of a lignosulphonate assists in reducing the amount of steam volatile materials and decomposition products which contaminate the exhaust air from the suction chamber.

The mat of fibres and uncured binder passes on the conveyor through an oven at about 400°F so as to achieve the curing of the binder. If necessary at this stage the mat on the conveyor can be compressed so that a board-like product is produced.

Each wall 4 is constituted by a number of plates 4C hinged together to form an endless band mounted on rollers (not shown) fixed on axles 6 spaced apart in the direction of travel of the conveyor 7, the axles 6 being driven by mechanisms 5, as shown. The lower part 4B of each wall 4 is in contact with an edge of the mat 9 so that the edges of the mat are made regular in shape.

We claim:

1. In a method for producing a glass fibre product which includes the steps of flowing a plurality of streams of molten glass, attenuating the streams to a desired fibre diameter by means of a high velocity gaseous blast, treating the fibres with a binder composition comprising an A stage phenol-aldehyde condensate resin which resin has been polymerised in the presence of a catalyst selected from the group consisting of an alkali and an alkaline earth metal hydroxide, projecting the fibres onto a conveyor, and conveying the binder coated fibres through a curing stage whereby said binder is cured and said fibres are bonded to one another at points of contact, the improvement comprising utilising an acidic lignosulphonate to neutralise at least part of the alkali or alkaline earth metal hydroxide catalyst of said resin by adding said acidic lignosulphonate to said resin at a pH above 7.5.

2. In a method as claimed in claim 1 wherein the alkaline catalyst is selected from the group consisting of sodium hydroxide, calcium hydroxide and barium hydroxide.

3. In a method as claimed in claim 2 wherein the A stage phenol-aldehyde condensate is a phenol-formaldehyde condensate.

4. In a method as claimed in claim 2 wherein the condensate is a co-polymer resin containing at least one amino-compound.

5. In a method resin containing at least one amino-compound is at least one of urea and dicyandiamide.

6. In a method as claimed in claim 1 wherein the acidic lignosulphonate is selected from the group consisting of ammonium lignosulphonate, calcium lignosulphonate, sodium lignosulphonate and magnesium lignosulphonate, being materials which when formed as a 10% solids solution give a solution having a pH below 7.

7. In a method as claimed in claim 6 wherein the quantity of lignosulphonate material used is in the range 10% to 20% of the total solids content of the binder applied to the fibre.

8. In a method as claimed in claim 1, wherein additional free acid is utilised in neutralising the alkaline catalyst.

9. In a method as claimed in claim 8 wherein the free acid is selected from the group consisting of sulphuric acid, formic acid, acetic acid and phosphoric acid.

10. In a binder composition formed by diluting an A stage phenol-aldehyde condensate resin, wherein the A stage condensate is produced in the presence of an alkali metal or alkaline earth metal hydroxide as a catalyst and wherein the catalyst is neutralised by an acidic material, the improvement that at least part of the acidic material used to neutralise the catalyst is an acidic lignosulphonate added to said resin at a pH above 7.5.

11. In a process for forming an aqueous solution of an A stage phenol-aldehyde condensate which process comprises the steps of reacting a phenol with an aqueous solution of formaldehyde in the presence of an alkali metal or alkaline earth metal hydroxide as a catalyst, and, when reaction to the A stage is completed, neutralising the reaction mixture to a pH in the range 6.5 to 7.5 with a mineral or organic acid, the improvement comprising at least partially replacing the mineral or organic acid with an acidic lignosulphonate or liquor containing such material.

12. A glass fibre product in which the binder applied to the product contains as a resin, a condensate prepared as claimed in claim 11.

13. A method as claimed in claim 1 wherein said acidic lignosulphonate is added to said A stage phenol-aldehyde condensate at the resin neutralisation stage and before the binder mixing stage.

14. A method as claimed in claim 1 wherein said acidic lignosulphonate is added to said A stage phenol-aldehyde condensate at the binder mixing stage.

15. A method as claimed in claim 1 wherein said phenol is a crude phenol contaminated with orthocresols.

16. A method as claimed in claim 1 wherein said catalyst is sodium hydroxide.

17. A method as claimed in claim 1 wherein said catalyst is calcium hydroxide.

18. A method as claimed in claim 1 wherein said phenol is a crude phenol contaminated with orthocresols and said catalyst is selected from the group consisting of barium hydroxide, sodium hydroxide and calcium hydroxide.

19. A method as claimed in claim 1 wherein said phenol is a crude phenol contaminated with orthocresols and said catalyst is sodium hydroxide.

20. A method as claimed in claim 1 wherein said phenol is a crude phenol contaminated with orthocresols and said catalyst is calcium hydroxide.

21. A binder composition as claimed in claim 10 wherein additional mineral or organic acid as free acid is added to said A stage phenol-aldehyde condensate to complete neutralisation.

22. A binder composition as claimed in claim 10 wherein said phenol is a crude phenol contaminated with orthocresols.

23. A binder composition as claimed in claim 10 wherein said catalyst is selected from the group consisting of barium hydroxide, sodium hydroxide and calcium hydroxide.

24. A binder composition as claimed in claim 10 wherein said catalyst is sodium hydroxide.

25. A binder composition as claimed in claim 10 wherein said catalyst is calcium hydroxide.

26. A binder composition as claimed in claim 10 wherein said phenol is crude phenol contaminated with orthocresols and said catalyst is selected from the group consisting of barium hydroxide, sodium hydroxide, and calcium hydroxide.

27. A binder composition as claimed in claim 10 wherein said phenol is a crude phenol contaminated with orthocresols and said catalyst is sodium hydroxide.

28. A binder composition as claimed in claim 10 wherein said phenol is a crude phenol contaminated with orthocresols and said catalyst is calcium hydroxide.

29. A process as claimed in claim 11 wherein said acidic lignosulphonate is added to said A stage phenol-aldehyde condensate at the binder mixing stage.

30. A process as claimed in claim 11 wherein said phenol is a crude phenol contaminated with orthocresols.

31. A process as claimed in claim 11 wherein said catalyst is sodium hydroxide.

32. A process as claimed in claim 11 wherein said catalyst is calcium hydroxide.

33. A process as claimed in claim 11 wherein said phenol is a crude phenol contaminated with orthocresols and said catalyst is selected from the group consisting of barium hydroxide, sodium hydroxide, and calcium hydroxide.

34. A process as claimed in claim 11 wherein said phenol is a crude phenol contaminated with orthocresols and said catalyst is sodium hydroxide.

35. A process as claimed in claim 11 wherein said phenol is a crude phenol contaminated with orthocresols and said catalyst is calcium hydroxide.

36. A method as claimed in claim 16 wherein the amount of sodium ions in said binder composition does not exceed 20 percent as percent on 100 percent binder solids.

37. A binder composition as claimed in claim 24 wherein the amount of sodium ions in said binder composition does not exceed 20 percent as percent on 100 percent binder solids.

38. A process as claimed in claim 31 wherein the amount of sodium ions in said binder does not exceed 20 percent as percent based on 100 percent binder solids.

* * * * *